(12) United States Patent
Schroers et al.

(10) Patent No.: US 10,706,503 B2
(45) Date of Patent: Jul. 7, 2020

(54) IMAGE PROCESSING USING A CONVOLUTIONAL NEURAL NETWORK

(71) Applicant: Disney Enterprises, Inc., Burbank, CA (US)

(72) Inventors: Christopher Schroers, Zürich (CH); Federico Perazzi, Zürich (CH); Caner Hazirbas, München (DE)

(73) Assignee: Disney Enterprises, Inc., Burbank, CA (US)

( * ) Notice: Subject to any disclaimer, the term of this patent is extended or adjusted under 35 U.S.C. 154(b) by 254 days.

(21) Appl. No.: 15/919,715

(22) Filed: Mar. 13, 2018

(65) Prior Publication Data

US 2019/0287215 A1    Sep. 19, 2019

(51) Int. Cl.
*G06K 9/62* (2006.01)
*G06T 3/40* (2006.01)
*G06T 5/00* (2006.01)

(52) U.S. Cl.
CPC .......... *G06T 3/4046* (2013.01); *G06T 3/4053* (2013.01); *G06T 5/002* (2013.01); *G06T 5/003* (2013.01)

(58) Field of Classification Search
CPC . G06T 2207/20081; G06T 2207/20084; G06T 3/4046; G06T 3/4053; G06T 5/001; G06T 5/002; G06T 5/003
See application file for complete search history.

(56) References Cited

U.S. PATENT DOCUMENTS

| | | | |
|---|---|---|---|
| 10,402,689 B1* | 9/2019 | Bogdanovych | G06K 9/74 |
| 10,424,087 B2* | 9/2019 | Risser | G06T 11/001 |
| 10,510,146 B2* | 12/2019 | Talathi | G06T 3/4053 |
| 2016/0055237 A1* | 2/2016 | Tuzel | G06F 16/353 382/224 |
| 2016/0350930 A1* | 12/2016 | Lin | G06K 9/66 |
| 2018/0268548 A1* | 9/2018 | Lin | G06F 17/2715 |
| 2018/0373964 A1* | 12/2018 | Kondo | G06K 9/6268 |

(Continued)

OTHER PUBLICATIONS

P. Isola, J.-Y. Zhu, T. Zhou, and A. A. Efros. "Image-to-Image Translation with Conditional Adversarial Networks." In CVPR, 2017.

(Continued)

*Primary Examiner* — Ian L Lemieux
(74) *Attorney, Agent, or Firm* — Farjami & Farjami LLP (57) ABSTRACT

According to one implementation, an image processing system includes a computing platform having a hardware processor and a system memory storing a software code including a convolutional neural network (CNN) trained using one or more semantic map(s). The hardware processor executes the software code to receive an original image including multiple object images each identified with one of multiple object classes, and to generate replications of the original image, each replication corresponding respectively to one of the object classes. The hardware processor further executes the software code to, for each replication, selectively modify one or more object image(s) identified with the object class corresponding to the replication, using the CNN, to produce partially modified images each corresponding respectively to an object class, and to merge the partially modified images, using the CNN, to generate a modified image corresponding to the original image.

20 Claims, 4 Drawing Sheets

(56) References Cited

U.S. PATENT DOCUMENTS

| | | | |
|---|---|---|---|
| 2019/0050667 A1* | 2/2019 | Wang | G06T 7/12 |
| 2019/0114774 A1* | 4/2019 | Zhang | G06N 3/0454 |
| 2019/0156154 A1* | 5/2019 | Tu | G06K 9/6262 |
| 2019/0164290 A1* | 5/2019 | Wang | G06T 7/10 |
| 2019/0171903 A1* | 6/2019 | Vajda | G06K 9/6256 |
| 2019/0205758 A1* | 7/2019 | Zhu | G06K 9/6256 |
| 2019/0251694 A1* | 8/2019 | Han | G06T 7/11 |
| 2019/0279074 A1* | 9/2019 | Lin | G06N 20/00 |
| 2019/0295302 A1* | 9/2019 | Fu | G06T 7/11 |
| 2019/0347804 A1* | 11/2019 | Kim | G06K 9/34 |
| 2019/0355103 A1* | 11/2019 | Baek | G06N 3/00 |
| 2019/0370666 A1* | 12/2019 | Ros Sanchez | G06T 5/50 |
| 2019/0370957 A1* | 12/2019 | Manickam | G06T 7/10 |
| 2019/0378242 A1* | 12/2019 | Zhang | G06T 11/001 |

OTHER PUBLICATIONS

T. Meinhardt, M. Moller, C. Hazirbas, and D. Cremers. "Learning Proximal Operators: Using Denoising Networks for Regularizing Inverse Imaging Problems." *In ICCV*, 2017.

J. Pan, Z. Hu, Z. Su, and M. Yang. "Deblurring Text Images Via 10 Intensity and Gradient Prior." *In CVPR*, 2014.

* cited by examiner

IMAGE PROCESSING USING A CONVOLUTIONAL NEURAL NETWORK

BACKGROUND

Image processing techniques are important to many applications. For example, image restoration, in which an unknown image is recovered from a degraded version of itself, may utilize various image processing techniques to restore the unknown image. Despite its usefulness for recovering lost image features, image restoration presents significant challenges. Specifically, for instance, the problems posed by image restoration tend to be inherently underdetermined because multiple plausible images can be recovered from the same degraded original image.

Due to its underdetermination, image restoration requires some prior information about the image undergoing restoration. Traditional approaches to obtaining such prior information have been variously based on edge statistics, sparse representation, gradients, self-similarities, or some combination of those features. Nevertheless, there remains a need in the art for an image processing solution capable of using non-traditional forms of prior information to more effectively guide the accurate restoration or enhancement of a degraded or corrupted image.

SUMMARY

There are provided systems and methods for performing image processing using a convolutional neural network, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses implementations that provide an image processing solution suitable for use in performing image restoration or other image modification tasks that overcomes the drawbacks and deficiencies in the conventional art. The disclosed implementations do so at least in part by utilizing semantic information to train a convolutional neural network (CNN). In one implementation, there is provided a CNN architecture in the form of an exemplary multi-stream semantic network (MSN) configured to guide image modification with pixel-wise semantic annotations.

The exemplary MSN includes a streaming stage of multiple parallel semantic streams, followed in series by a fusion stage. The individual semantic streams of the streaming stage correspond respectively to object classes with which object images included in an original image undergoing modification can be identified. The original image undergoing modification is replicated for each object class. Each semantic stream is used to selectively modify one or more object images identified with the object class corresponding to that semantic stream, in one of the replicated images, resulting in multiple partially modified images each produced by a respective one of the semantic streams.

The fusion stage merges the partially modified images, which may number up to one hundred, or more, to generate a modified image corresponding to the original image. One significant advantage of the present solution is that use of a semantic map or maps is limited to training the MSN. Once trained, the MSN is configured to generate a modified image corresponding to an original image without using a semantic map of the original image. This is advantageous because semantic maps are typically expensive to obtain. As a result, the present solution discloses a cost effective image processing solution suitable for use with a wide variety of image modification techniques including deblurring, denoising, super-resolution, and image restoration, to name a few.

It is noted that, as defined in the present application, a CNN is a deep artificial neural network including layers that apply a convolution operation to an input to the CNN. Such a CNN is a machine learning engine designed to progressively improve its performance of a specific task. In various implementations, CNNs may be utilized to perform image processing or natural-language processing. It is further noted that, as defined in the present application, an MSN is a CNN having the characteristics described in the present application below by reference to FIG. 3.

The present disclosure refers to "semantic information" and features described as "semantic maps". As used herein, the feature semantic map has its commonly understood meaning in the art. Thus, a semantic map can be used to associate object images within an image such as a photograph or video frame with natural-language labels. Semantic information, in addition to the natural-language labels applied to object images, can include concepts linking the natural-language labels, and thus describing the object images associated with those natural-language labels. In the present application, each "object class" may have a unique natural-language label, such as "human", "vehicle", or "building", for example, and individual object images appearing within an image may be identified with an object class. For instance, an image of a man or of a woman or of a child may be identified with the object class "human", while an image of a car, truck, or motorcycle may be identified with the object class "vehicle," and so forth.

Figure 1:
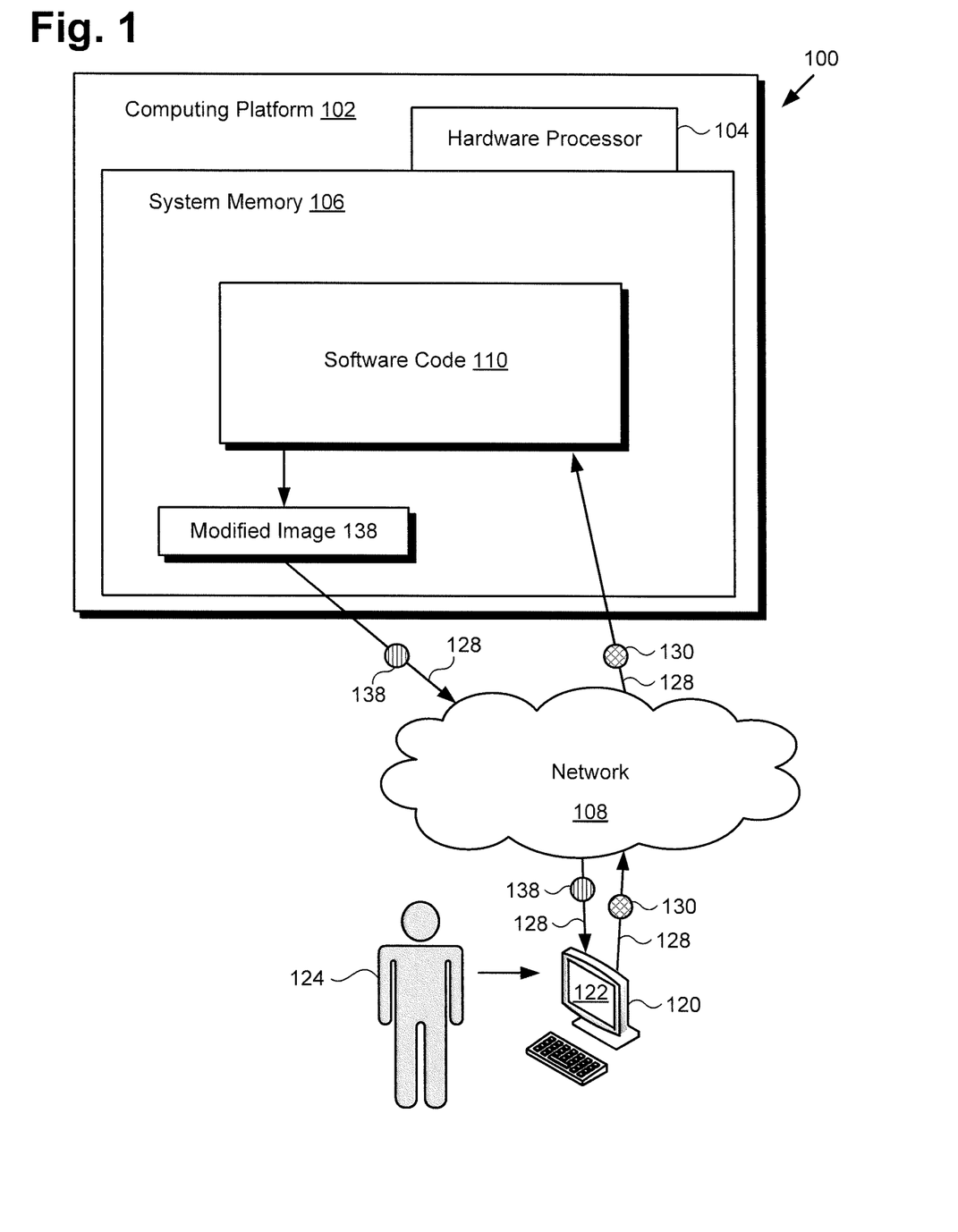
FIG. 1 shows a diagram of an exemplary system for performing image processing using a convolutional neural network (CNN), according to one implementation.

FIG. 1 shows a diagram of an exemplary system for performing image processing using a CNN, according to one implementation. As shown in FIG. 1, image processing system 100 includes computing platform 102 having hardware processor 104, and system memory 106 implemented as a non-transitory storage device. According to the present exemplary implementation, system memory 106 stores software code 110.

As further shown in FIG. 1, image processing system 100 is implemented within a use environment including communication network 108, user system 120 including display 122, and user 124 utilizing user system 120. Also shown in FIG. 1 are network communication links 128 interactively connecting user system 120 and image processing system 100 via communication network 108, original image 130, and modified image 138 corresponding to original image 130 and produced using software code 110.

It is noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110 as being stored in its entirety in system memory 106, such a depiction is provided merely as an aid to conceptual clarity. More generally, image processing system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within image processing system 100. Thus, it is to be understood that various features of software code 110, such as one or more of the features described below by reference to FIG. 2, may be stored and/or executed using the distributed memory and/or processor resources of image processing system 100.

According to the implementation shown by FIG. 1, user 124 may utilize user system 120 to interact with image processing system 100 over communication network 108. In one such implementation, image processing system 100 may correspond to one or more web servers, accessible over a packet-switched network such as the Internet, for example. Alternatively, image processing system 100 may correspond to one or more computer servers supporting a local area network (LAN), or included in another type of limited distribution network.

Although user system 120 is shown as a desktop computer in FIG. 1, that representation is also provided merely as an example. More generally, user system 120 may be any suitable mobile or stationary computing device or system that implements data processing capabilities sufficient to provide a user interface, support connections to communication network 108, and implement the functionality ascribed to user system 120 herein. For example, in other implementations, user system 120 may take the form of a laptop computer, tablet computer, or smartphone, for example. User 124 may utilize user system 120 to interact with image processing system 100 to use software code 110, executed by hardware processor 104, to produce modified image 138 corresponding to original image 130.

It is noted that, in various implementations, modified image 138, when generated using software code 110, may be stored in system memory 106 and/or may be copied to non-volatile storage. Alternatively, or in addition, as shown in FIG. 1, in some implementations, modified image 138 may be sent to user system 120 including display 122, for example by being transferred via network communication links 128 of communication network 108. It is further noted that display 122 may be implemented as a liquid crystal display (LCD), a light-emitting diode (LED) display, an organic light-emitting diode (OLED) display, or another suitable display screen that performs a physical transformation of signals to light.

Figure 2:
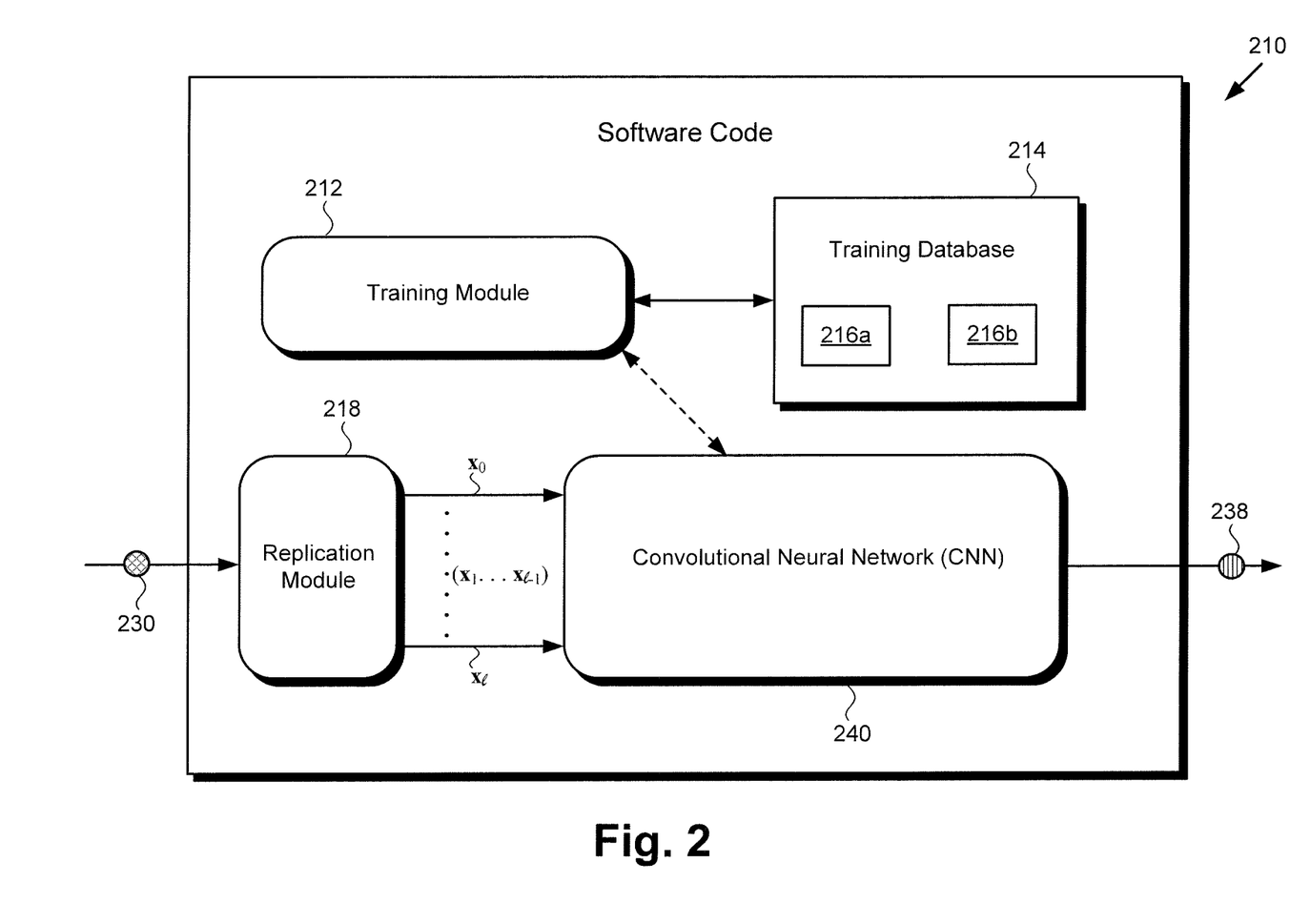
FIG. 2 shows an exemplary diagram of a software code suitable for execution by a hardware processor of the system shown by FIG. 1, according to one implementation.

FIG. 2 shows exemplary software code 210 suitable for execution by hardware processor 104 of computing platform 102, in FIG. 1, according to one implementation. As shown in FIG. 2, software code 210 may include CNN 240. In addition, FIG. 2 shows original image 230 and modified image 238 generated using CNN 240 and corresponding to original image 230. As further shown in FIG. 2, software code 210 can include training module 212, training database 214 storing semantic maps 216a and 216b, and replication module 218 receiving original image 230 (x) as an input and providing replications $\{x_i\}_{i=0}^{I}$ of original image 230 x as outputs.

Original image 230 and modified image 238 correspond respectively in general to original image 130 and modified image 138, in FIG. 1, and those corresponding features may share any of the characteristics attributed to either corresponding feature by the present disclosure. In addition, software code 210 corresponds in general to software code 110, and those corresponding features may share the characteristics attributed to any of the corresponding features by the present disclosure. That is to say, like software code 210, software code 110 may include a CNN corresponding to CNN 240, as well as features corresponding respectively to training module 212, training database 214 storing semantic maps 216a and 216b, and replication module 218.

Figure 3:
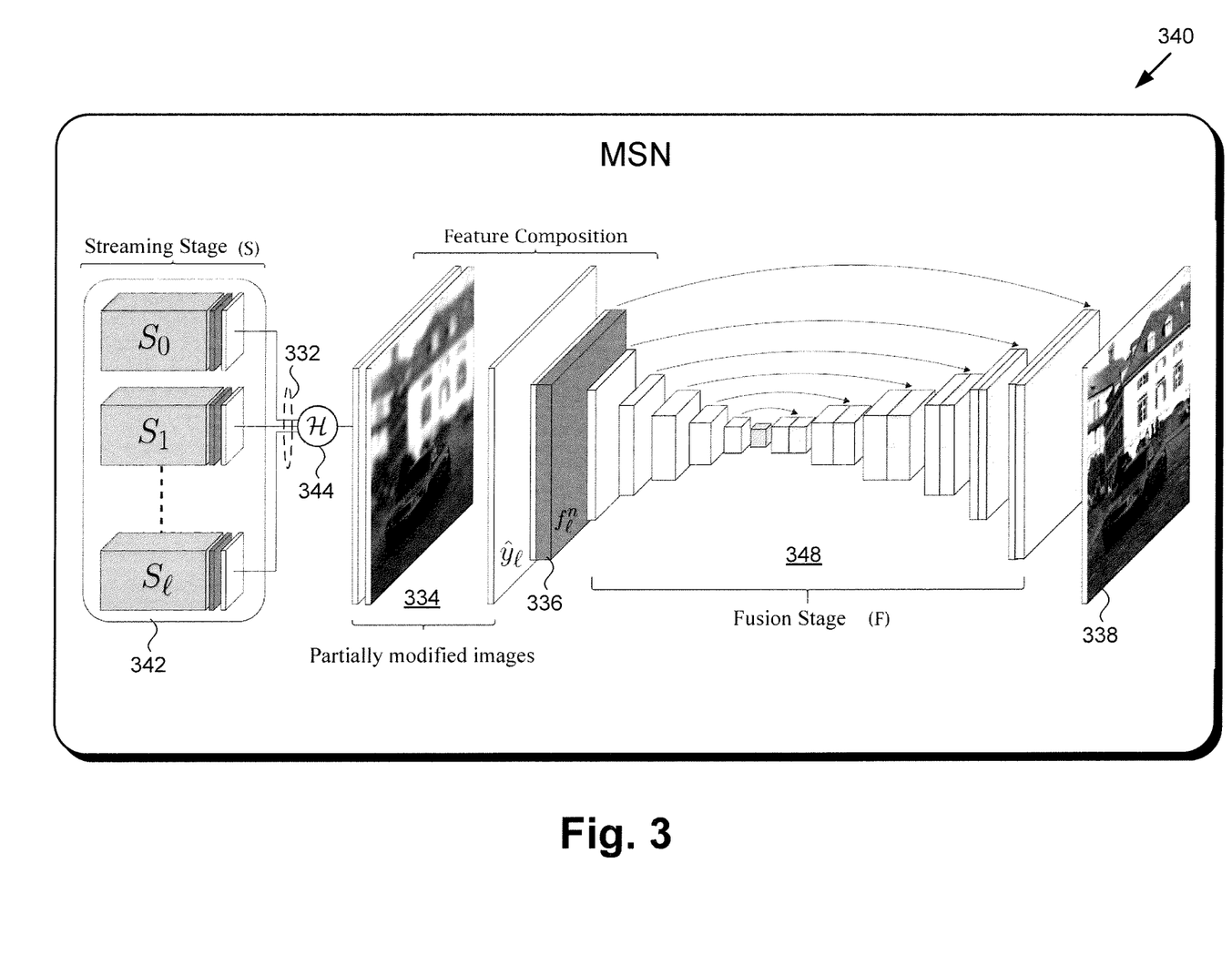
FIG. 3 shows a diagram of an exemplary CNN in the form of a multi-stream semantic network (MSN) included in the software code of FIG. 2.

FIG. 3 shows a diagram of a CNN in the form of exemplary MSN 340, according to one implementation. It is noted that MSN 340, in FIG. 3, is a specific exemplary implementation of CNN 240, in FIG. 2, and corresponds in general to CNN 240. Consequently, CNN 240 and MSN 340 can share any of the features attributed to either corresponding feature by the present disclosure.

As shown in FIG. 3, MSN 340 includes streaming stage 342 (S) having multiple parallel semantic streams 332 $\{S_i\}_{i=0}^{c}$ followed in series by fusion stage (F) 348. Also shown in FIG. 3 are operator function $\mathcal{H}$ 344, partially modified images 334, feature maps 336, and modified image 338. Modified image 338 corresponds in general to modified image 138/238 in FIG. 1/2, and those corresponding features may share any of the characteristics attributed to any corresponding feature by the present disclosure. Thus, like modified image 138/238, modified image 338 is a modified, e.g., enhanced or restored, version of original image 130/230.

Figure 4:
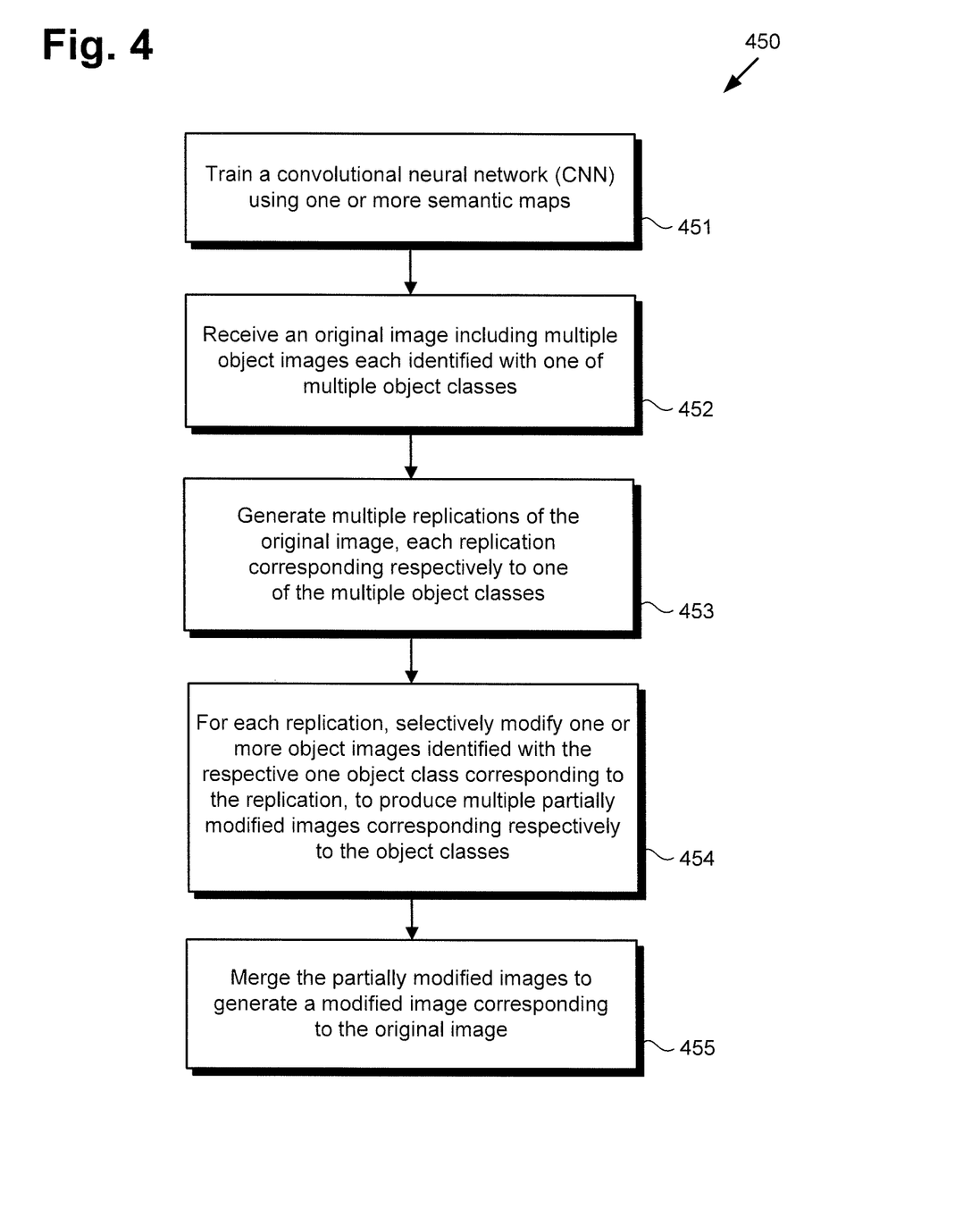
FIG. 4 shows a flowchart presenting an exemplary method for performing image processing using a CNN, according to one implementation.

The functionality of software code 110/210 and CNN/MSN 240/340 will be further described by reference to FIG. 4 in combination with FIGS. 1, 2, and 3. FIG. 4 shows flowchart 450 presenting an exemplary method for performing image processing using a CNN, according to one implementation. With respect to the method outlined in FIG. 4, it is noted that certain details and features have been left out of flowchart 450 in order not to obscure the discussion of the inventive features in the present application. It is further noted that, in the interests of consistency of the following comments, the image processing actions of flowchart 450 will be described for the exemplary use case of image restoration. However, it is emphasized that the method outlined in flowchart 450 may be suitably adapted for other specific image processing tasks, such as image modification through image enhancement or otherwise.

Referring now to FIG. 4 in combination with FIGS. 1, 2, and 3, flowchart 450 begins with training CNN/MSN 240/340 using one or more of semantic maps 216a and/or 216b (action 451). CNN/MSN 240/340 may be trained using software code 110/210, executed by hardware processor 104, and using training module 212 and training database 214, as described below.

CNN/MSN 240/340 may be trained in two phases. In the first phase, streaming stage 342 is trained using one or more of semantic maps 216a and/or 216b. In that first phase of training, the parallel semantic streams 332, i.e., $\{S_l\}_{l=0}^{c}$, are trained independently of one another using one or more of semantic maps 216a and/or 216b. In the second phase, fusion stage 348 is trained using one or more of semantic maps 216a and/or 216b. In other words, streaming stage 342 and fusion stage 348 are trained independently of one another, and each of semantic streams 332 are trained independently of one another during the training of streaming stage 342.

CNN/MSN 240/340 may be trained at an initial learning rate of $2 \times 10^{-4}$, for example, with step decay. The batch size may be 1. Each training phase may consist of 200 epochs. In one implementation, input images are downsampled to 286×286 resolution through bicubic interpolation and are randomly cropped to size 256×256. The red-green-blue (RGB) color space may be normalized to zero mean and unit standard deviation. The semantic labels of semantic maps 216a and 216b may be resized accordingly but downsampled with nearest-neighbor interpolation.

For the specific use case of image restoration, let $x \in X$ represent a degraded image, i.e., original image 130/230, and let $y \in Y$ represent the non-degraded true image (hereinafter "ground-truth image") corresponding to x. Given a training dataset $D=\{(x^{(i)}, y^{(i)})\}_{i=1}^{N}$, solving an object class agnostic image restoration problem entails learning a function $f: X \rightarrow Y$ that generates a modified image $\hat{y}=f(x)$, i.e., modified image 138/238/338, as similar as possible to the ground-truth image y.

Without loss of generality, an arbitrary degradation process can be defined as $\delta: Y \rightarrow X$. The objective function can then be defined as the function f that minimizes the reconstruction error between the ground-truth image y and modified image 138/238/338 $\hat{y}$:

$$f = \underset{f}{\operatorname{argmin}} \, \mathbb{E}_y \| f(x) - y \|_1, \quad \text{(Equation 1A)}$$

The function f can be learned from the training dataset as an approximation to the inverse of the degrading operator $\delta$.

With respect to semantic maps 216a and 216b, let c denote the number of object classes in a semantically annotated dataset $D_l$ corresponding to either or both of semantic maps 216a and 216b. $D_l = \{(x^{(i)}, y^{(i)}, l^{(i)})\}_{i=1}^{N}$, where $I \in \{0, c\}^{m \times n \times 1}$ indicates that semantic maps 216a and 216b are pixel-wise semantically annotated. CNN/MSN 240/340 is trained over $D_l$ in two supervised phases, i.e., the first and second training phases described above.

In the first training phase, each of semantic streams 332 $\{S_l\}_{l=0}^{c}$ is independently trained to minimize the objective function:

$$f_{\ell} = \underset{f_{\ell}}{\operatorname{argmin}} \, \mathbb{E}_y \| f_{\ell}(x) - y_{\ell} \|_1, \quad \text{(Equation 1B)}$$

where $y_l$ denotes the ground-truth image y degraded only in regions identified with an object class semantic label different from l, i.e., $\overline{\Omega}_l = \Omega/\Omega_l$, where the $\Omega_l$ are semantic regions of original image 130/230 x.

In the second training phase, fusion stage 348 is trained to assemble modified image 138/238/338 $\hat{y}$ while minimizing the reconstruction error defined in Equation 1A. Initially during the second training phase, the parameters of streaming stage 342 are fixed, and only fusion stage 348 is trained. Upon convergence, the entire network CNN/MSN 240/340, i.e., streaming stage 342 and fusion stage 348, is jointly fine-tuned to minimize the same objective function. According to one implementation, the $l_1$-norm is used to minimize the reconstruction error because it has been found to produce sharper results than the $l_2$-norm.

Given a triplet $(x, y, l) \in D_l$ the overall training objective function can be defined by Equation 2:

$$\mathcal{L}_{(F,S)} = (1-\lambda)\Sigma_{l=0}^{n} \| S_l(x) - y_l \|_1 + \lambda \| F(\mathcal{H}(S_{0 \rightarrow l}(x))) - y \|_1,$$

where S represents streaming stage 342 and F represents fusion stage 348. The symbol $\mathcal{H}$ represents operator function 344, a composite function that concatenates the set of partially modified images 334, i.e., $\{\hat{y}_l\}_{l=0}^{c}$ along their depth channel, and combines feature map 336 $f_l^n$ of the last feature layer of $S_l$, as described in greater detail below. It is noted that λ represents a hyperparameter that balances the contributions of the two terms in Equation 2. The hyperparameter λ may be set to zero (0.0) during the first training phase and to one (1.0) during the second training phase. When training of CNN/MSN 240/340 is complete, λ may be set to a value between 0.0 and 1.0, such as 0.5, for example.

Referring once again to FIG. 4 in combination with FIGS. 1, 2, and 3, flowchart 450 continues with receiving original image 130/230 x including multiple object images each identified with one of multiple object classes (action 452). By way of example, user 124 may utilize user system 120 to interact with image processing system 100 in order to produce modified image 138/238/338 $\hat{y}$ corresponding to original image 130/230 x. As shown by FIG. 1, in one implementation, user 124 may do so by transmitting original image 130/230 x from user system 120 to image processing system 100 via communication network 108 and network communication links 128. Alternatively, original image 130/230 x may be received from a third party source, or may be stored in system memory 106. Original image 130/230 x may be received by software code 110/210 including CNN/MSN 240/340, executed by hardware processor 104.

Original image 130/230 x may be a photograph or a video frame, for example, and may include object images depicting one or more people, one or more structures, and/or one or more vehicles. As noted above, the individual object images appearing within original image 130/230 x may be identified with an object class $O: \{o_l\}_{l=0}^{c}$ each having a unique natural-language label, such as "human", "vehicle", or "building". Thus, an image of an object in original image 130/230 x having the form of a man, a woman or a child may be identified with the object class "human", while an image of a car, truck, or motorcycle may be identified with the object class "vehicle," and so forth.

Flowchart 450 continues with generating multiple replications $\{x_i\}_{i=0}^{l}$ of original image 130/230 x, each replication $\{x_i\}_{i=0}^{l}$ corresponding respectively to one of the object classes O (action 453). In other words, in implementations in which the number of object classes is c, the replications of original image 130/230 x may also number c, i.e., $\{x_l\}_{l=0}^{c}$. The replications $\{x_l\}_{l=0}^{c}$ of original image 130/230 x may be generated by software code 110/210, executed by hardware processor 104, and using replication module 218.

Flowchart 450 continues with, for each replication $\{x_l\}_{l=0}^{c}$ of original image 130/230 x, selectively modify one or more object images identified with the one object class corresponding to the replication, to produce multiple partially modified images $\{\hat{y}_l\}_{l=0}^{c}$ corresponding respectively to the object classes (action 454). Partially modified images $\{\hat{y}_l\}_{l=0}^{c}$ may be produced by software code 110/210, executed by hardware processor 104, and using CNN/MSN 240/340.

As shown in FIG. 2, replications $\{x_l\}_{l=0}^{c}$ of original image 130/230 x are provided as inputs to CNN/MSN 240/340 by replication module 218 of software code 110/210. Referring to FIG. 3, according to one implementation, and as noted above, streaming stage 342 (S) includes multiple parallel semantic streams 332 $\{S_l\}_{l=0}^{c}$ corresponding respectively to the object classes $\{O_l\}_{l=0}^{c}$. That is to say, each of semantic streams 332 $\{S_l\}_{l=0}^{c}$ corresponds to a respective one of object classes $\{O_l\}_{l=0}^{c}$. Each semantic stream $S_l$ ingests a respective replication $x_l$ of original image 130/230 x and produces as its output a partially modified image $\hat{y}_l = S_l(x_c)$.

Each partially modified image $\hat{y}_l$ is modified only in regions of original image 130/230 x that are annotated with the semantic label l, those regions being identified as regions $\Omega_l$. Consequently, the output of semantic streams 332 is a set of partially modified images 334 $\{\hat{y}_l\}_{l=0}^{c}$, each modified in different semantic regions such that their union covers the entire original image 130/230 x, i.e., $\cup_{l=0}^{c} \Omega_l \rightarrow \Omega$. It is noted that the object classes $\{O_l\}_{l=0}^{c}$, and hence, according to one implementation, the partially modified images 334 $\{\hat{y}_l\}_{l=0}^{c}$ may number up to one hundred, or more.

Flowchart 450 can conclude with merging partially modified images 334 $\{\hat{y}_l\}_{l=0}^{c}$ to generate modified image 138/238/338 $\hat{y}$ corresponding to original image 130/230 x (action 455). Partially modified images $\{\hat{y}_l\}_{l=0}^{c}$ may be merged to generate modified image 138/238/338 $\hat{y}$ corresponding to original image 130/230 x by software code 110/210, executed by hardware processor 104, and using CNN/MSN 240/340.

Let $$f_{\ell}^n \in \mathbb{R}^{\frac{m}{2} \times \frac{n}{2} \times d}$$

denote the last feature layer of feature maps 336 of $S_l$. Fusion stage 348 receives $\theta = \{\theta_l\}_l^c$ as input and produces modified image 138/238/338 $\hat{y}$ as output; $\theta_e = (\hat{y}_l, f_l^n)$ contains the last feature layer of feature maps 336 and the multiple partially modified images 334 obtained from $S_l$.

Given $\theta$ as input, fusion stage 348 generates modified image 138/238/338 $\hat{y}$ as:

$$\hat{y} = (F \circ \mathcal{H})(\theta_0, \theta_1, \ldots, \theta_{l-1}) \quad \text{(Equation 3)}$$

As noted above, $\mathcal{H}$ represents operator function 344, and is a composite function that concatenates the set of partially modified images 334, i.e., $\{\hat{y}_l\}_{l=0}^{c}$ along their depth channel. In addition, $\mathcal{H}$ combines feature maps $f_l^n$ with the element-wise sum, such that:

$$\mathcal{H}(\theta) = [\hat{y}_{0 \rightarrow l}, \Sigma_{i=0} f_i^n] \quad \text{(Equation 4)}$$

As shown by FIG. 3, partially modified images 334 are provided to fusion stage 348 as an input data layer while the features are concatenated to the output of its first convolution.

It is emphasized that, after CNN/MSN 240/340 has been trained using the semantically annotated datasets corresponding to semantic maps 216a and/or 216b, as described above by reference to action 451, the subsequent actions of flowchart 450 may be performed on multiple different original images 130/230 x without using semantic maps of those respective original images. In other words, hardware processor 104 can be configured to execute software code 110/210 to utilize CNN/MSN 240/340 to perform actions 452, 453, 454, and 455 (hereinafter "actions 452-455") without using a semantic map of, i.e., specific to, original image 130/230 x. As noted above, this can be advantageous because semantic maps can be expensive to obtain.

Moreover, and as a result of that advantageous feature of CNN/MSN 240/340, software code 110/210 including CNN/MSN 240/340 may be implemented in a variety of use cases to perform a wide range of image processing tasks. For example, in some implementations, software code 110/210 may utilize CNN/MSN 240/340 to perform super-resolution of original image 130/230 x. In those implementations, modified image 138/238/338 $\hat{y}$ may be a super-resolution image corresponding to original image 130/230 x.

In addition, or alternatively, in some implementations, software code 110/210 may utilize CNN/MSN 240/340 to perform one or both of deblurring and denoising of original image 130/230 x. In those implementations, modified image 138/238/338 $\hat{y}$ may be a deblurred and/or denoised image corresponding to original image 130/230 x.

Moreover, in implementations corresponding specifically to exemplary actions 452-455 of flowchart 450, software code 110/210 may utilize CNN/MSN 240/340 to perform image restoration of original image 130/230 x. In those implementations, original image 130/230 x may be a degraded image corresponding to a ground truth image y, and modified image 138/238/338 $\hat{y}$ may be a restored image more similar to ground truth image y than original image 130/230 x is.

It is noted that, although not included in flowchart 450, in some implementations, the present method can include rendering modified image 138/238/338 $\hat{y}$ on display 122 of user system 120. As noted above, display 122 may be implemented as an LCD, LED display, or an OLED display, for example. Moreover, in implementations in which hardware processor 104 executes software code 110/210 to utilize CNN/MSN 240/340 to perform super-resolution of original image 130/230 x, display 122 may take the form of a high-definition (HD) display, or an Ultra HD display such as a 4K or 8K resolution display. That is to say, in some implementations, modified image 138/238/338 $\hat{y}$ may be rendered as an HD or Ultra HD image on display 122.

In some implementations, user system 120 including display 122 may be integrated with image processing system 100 such that display 122 may be controlled by hardware processor 104 of computing platform 102. In other implementations, as noted above, software code 110/240 including CNN/MSN 240/340 may be stored on a computer-readable non-transitory medium, and may be accessible to the hardware processing resources of user system 120. In those implementations, the rendering of modified image 138/238/338 ŷ on display 122 may be performed by software code 110/210, executed either by hardware processor 104 of computing platform 102, or by a hardware processor of user system 120.

Thus, the present application discloses an image processing solution suitable for use in performing image restoration or other image modifications. By utilizing semantic information to train a CNN implemented using a novel and inventive MSN architecture, the present solution guides image modification with pixel-wise semantic annotations. Moreover, once trained, the CNN can be used to generate a modified image corresponding to an original image without using a semantic map of the original image, which may be expensive to obtain. As a result, the present solution discloses a cost effective image processing solution suitable for use with a wide variety of image modification techniques including deblurring, denoising, and super-resolution.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image processing system comprising:
 a computing platform including a hardware processor and a system memory;
 a software code stored in the system memory, the software code including a convolutional neural network (CNN) trained using at least one semantic map;
 the hardware processor configured to execute the software code to:
  receive an original image including a plurality of object images each identified with one of a plurality of object classes;
  generate a plurality of replications of the original image, each replication corresponding respectively to one of the plurality of object classes;
  for each replication, selectively modify at least one object image identified with the respective one corresponding object class, using the CNN, to produce a plurality of partially modified images corresponding respectively to the plurality of object classes; and
  merge the plurality of partially modified images, using the CNN, to generate a modified image corresponding to the original image.

2. The image processing system of claim 1, wherein the CNN is configured to produce the plurality of partially modified images, and to merge the plurality of partially modified images to generate the modified image, without using a semantic map of the original image.

3. The image processing system of claim 1, wherein the CNN comprises a multi-stream semantic network (MSN) including a semantic streaming stage followed in series by a fusion stage.

4. The image processing system of claim 3, wherein the semantic streaming stage and the fusion stage are trained independently of one another, using the at least one semantic map.

5. The image processing system of claim 3, wherein the semantic streaming stage includes a plurality of parallel semantic streams, and wherein the plurality of parallel semantic streams are trained independently of one another.

6. The image processing system of claim 5, wherein each of the plurality of parallel semantic streams corresponds to a respective one of the plurality of object classes.

7. The image processing system of claim 1, wherein the modified image comprises a super-resolution image corresponding to the original image.

8. The image processing system of claim 1, wherein the original image corresponds to a ground-truth image, and wherein the modified image is a restored image more similar to the ground-truth image than the original image is.

9. The image processing system of claim 1, wherein the modified image comprises an image that is at least one of deblurred and denoised relative to the original image.

10. The image processing system of claim 1, wherein the plurality of partially modified images comprises up to one hundred partially modified images.

11. A method for use by an image processing system including a computing platform having a hardware processor and a system memory storing a software code including a convolutional neural network (CNN) trained using at least one semantic map, the method comprising:
 receiving, using the hardware processor, an original image including a plurality of object images each identified with one of a plurality of object classes;
 generating, using the hardware processor, a plurality of replications of the original image, each replication corresponding respectively to one of the plurality of object classes;
 for each replication, selectively enhancing, using the hardware processor and the CNN, at least one object image identified with the respective one corresponding object class, to produce a plurality of partially modified images corresponding respectively to the plurality of object classes; and
 merging, using the hardware processor and the CNN, the plurality of partially modified images to generate a modified image corresponding to the original image.

12. The method of claim 11, wherein the CNN is configured to produce the plurality of partially modified images, and to merge the plurality of partially modified images to generate the modified image, without using a semantic map of the original image.

13. The method of claim 11, wherein the CNN comprises a multi-stream semantic network (MSN) including a semantic streaming stage followed in series by a fusion stage.

14. The method of claim 13, wherein the semantic streaming stage and the fusion stage are trained independently of one another, using the at least one semantic map.

15. The method of claim 13, wherein the semantic streaming stage includes a plurality of parallel semantic streams, and wherein the plurality of parallel semantic streams are trained independently of one another.

16. The method of claim 15, wherein each of the plurality of parallel semantic streams corresponds to a respective one of the plurality of object classes.

17. The method of claim 11, wherein the modified image comprises a super-resolution image corresponding to the original image.

18. The method of claim 11, wherein the original image corresponds to a ground-truth image, and wherein the modified image is a restored image more similar to the ground-truth image than the original image is.

19. The method of claim 11, wherein the modified image comprises an image that is at least one of deblurred and denoised relative to the original image.

20. The method of claim 11, wherein the plurality of partially modified images comprises up to one hundred partially modified images.

* * * * *